US012572625B1

(12) United States Patent
Lien et al.

(10) Patent No.: US 12,572,625 B1
(45) Date of Patent: Mar. 10, 2026

(54) CORE CRITICALITY PERFORMANCE ENHANCEMENTS

(71) Applicant: Apple Inc., Cupertino, CA (US)

(72) Inventors: Wei-Han Lien, Saratoga, CA (US); Edvin Catovic, San Francisco, CA (US); Nikhil Gupta, Santa Clara, CA (US); Mridul Agarwal, Saratoga, CA (US); Haoyan Jia, Ellicott City, MD (US); Ethan R. Schuchman, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 558 days.

(21) Appl. No.: 18/149,392

(22) Filed: Jan. 3, 2023

Related U.S. Application Data

(60) Provisional application No. 63/370,455, filed on Aug. 4, 2022.

(51) Int. Cl.
*G06F 9/30* (2018.01)
*G06F 3/06* (2006.01)
(Continued)

(52) U.S. Cl.
CPC ........ *G06F 18/2413* (2023.01); *G06F 9/3836* (2013.01); *G06F 3/0611* (2013.01); *G06F 9/38* (2013.01); *G06F 9/3804* (2013.01); *G06F 9/382* (2013.01); *G06F 9/3838* (2013.01); *G06F 9/3885* (2013.01); *G06F 9/3887* (2013.01); *G06F 9/3889* (2013.01);
(Continued)

(58) Field of Classification Search
CPC ...... G06F 18/2413; G06F 9/3836; G06F 9/38;
G06F 9/382; G06F 9/3804; G06F 9/3838;
G06F 9/3885; G06F 9/3887; G06F
9/3889; G06F 9/50; G06F 3/0611; G06F
12/0888; G06F 12/0891; G06F 12/0897;
G06F 12/123; G06F 12/128; G06F
12/0862; G06F 12/0828
See application file for complete search history.

(56) References Cited

U.S. PATENT DOCUMENTS

| | | |
|---|---|---|
| 8,615,634 B2 | 12/2013 | Daly et al. |
| 8,990,506 B2 | 3/2015 | Cherukuri et al. |

(Continued)

OTHER PUBLICATIONS

Brian Fields, et al., "Focusing Processor Policies via Critical-Path Prediction," Computer Sciences Department, University of Wisconsin-Madison, 2001, pp. 1-12.

(Continued)

*Primary Examiner* — Anibal Riveracruz
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to critical path identification and prioritization. In some embodiments, criticality detection circuitry is configured to sparsely assign tokens to a subset of instructions to be executed by pipeline circuitry, track a distance between execution of the instruction and execution of one or more instructions that depend on the instruction, and train instructions as predicted-critical or not based on tracked distances. In some embodiments, scheduling circuitry is configured to prioritize predicted-critical instructions over other instructions for issuance.

19 Claims, 10 Drawing Sheets

(51) Int. Cl.

| | |
|---|---|
| *G06F 9/38* | (2018.01) |
| *G06F 9/46* | (2006.01) |
| *G06F 9/50* | (2006.01) |
| *G06F 18/2413* | (2023.01) |
| *G06F 12/0811* | (2016.01) |
| *G06F 12/0817* | (2016.01) |
| *G06F 12/0862* | (2016.01) |
| *G06F 12/0888* | (2016.01) |
| *G06F 12/0891* | (2016.01) |
| *G06F 12/0897* | (2016.01) |
| *G06F 12/123* | (2016.01) |
| *G06F 12/126* | (2016.01) |
| *G06F 12/128* | (2016.01) |

(52) U.S. Cl.

CPC ...... *G06F 12/0811* (2013.01); *G06F 12/0828* (2013.01); *G06F 12/0862* (2013.01); *G06F 12/0888* (2013.01); *G06F 12/0891* (2013.01); *G06F 12/0897* (2013.01); *G06F 12/123* (2013.01); *G06F 12/126* (2013.01); *G06F 12/128* (2013.01)

(56) References Cited

U.S. PATENT DOCUMENTS

| | | | | |
|---|---|---|---|---|
| 9,471,313 | B1 * | 10/2016 | Busaba | G06F 9/30087 |
| 9,535,696 | B1 * | 1/2017 | Gschwind | G06F 12/0875 |
| 10,289,558 | B2 | 5/2019 | Kamruzzaman | |
| 10,474,375 | B2 | 11/2019 | Fleming, Jr. et al. | |
| 10,684,860 | B2 | 6/2020 | Lin | |
| 10,846,241 | B2 | 11/2020 | Zaydman | |
| 2011/0145506 | A1 | 6/2011 | Cherukuri et al. | |
| 2012/0203968 | A1 | 8/2012 | Daly et al. | |
| 2015/0067691 | A1 * | 3/2015 | Johnson | G06F 9/5027 |
| | | | | 718/103 |
| 2015/0089152 | A1 * | 3/2015 | Busaba | G06F 12/0831 |
| | | | | 711/141 |
| 2015/0121046 | A1 | 4/2015 | Kunjan et al. | |
| 2015/0378927 | A1 * | 12/2015 | Bradbury | G06F 9/3842 |
| | | | | 711/141 |
| 2016/0117118 | A1 * | 4/2016 | Martínez | G06F 3/0611 |
| | | | | 711/167 |
| 2019/0018798 | A1 | 1/2019 | Al Sheikh et al. | |
| 2021/0027167 | A1 * | 1/2021 | Goloubew | G06N 3/0499 |
| 2021/0165642 | A1 | 6/2021 | ChoFleming | |

OTHER PUBLICATIONS

Samantika Subramaniam Anne Bracyy Hong Wangy Gabriel H. Loh; "Criticality-Based Optimizations for Efficient Load Processing"; Georgia Institute of Technology & Intel Corporation, College of Computing Microarchitecture Research Laboratory, Atlanta, GA, USA Santa Clara, CA, USA fsamantik, lohg@cc.gatech.edu fanne. c.bracy,hong.wangg@intel.com, in the proceedings of the 35th ACM/IEEE International Conference on High-Performance Computer Architecture, Feb. 2009,12 pages.

Srikanth T. Srinivasan, Roy Dz-ching Ju, Alvin R. Lebeck, Chris Wilkerson; "Locality vs. Criticality"; Department of Computer Science,Microprocessor Research Labs, Duke University Intel Corporation fsri, alvyg@cs.duke.edu froy.ju, chris.wilkersong@intel. com; Appears in Proceedings of the 28th International Symposium on Computer Architecture, Jun. 2001. Copyright IEEE 2001, 13 pages.

Samira Khany, samirakhan@cmu.edu, Alaa R. Alameldeen, alaa.r. alameldeen@intel.com, Chris Wilkerson,chris.wilkerson@intel. com, Onur Mutluy onur@cmu.edu, Daniel A. Jim'enezz djimenez@cs. tamu.edu; "Improving Cache Performance by Exploiting Read-Write Disparity"; Carnegie Mellon University, Intel Labs, Texas A&M University, Date of Conference: Feb. 15-19, 2014; Date Added to IEEE Xplore: Jun. 19, 2014; Electronic ISBN:978-1-4799-3097-5; 12 pages.

U.S. Appl. No. 17/727,031, filed Apr. 22, 2022.

* cited by examiner

*Example token tracking entry 200*

*Example criticality training entry 210*

*Example criticality prediction entry 220*

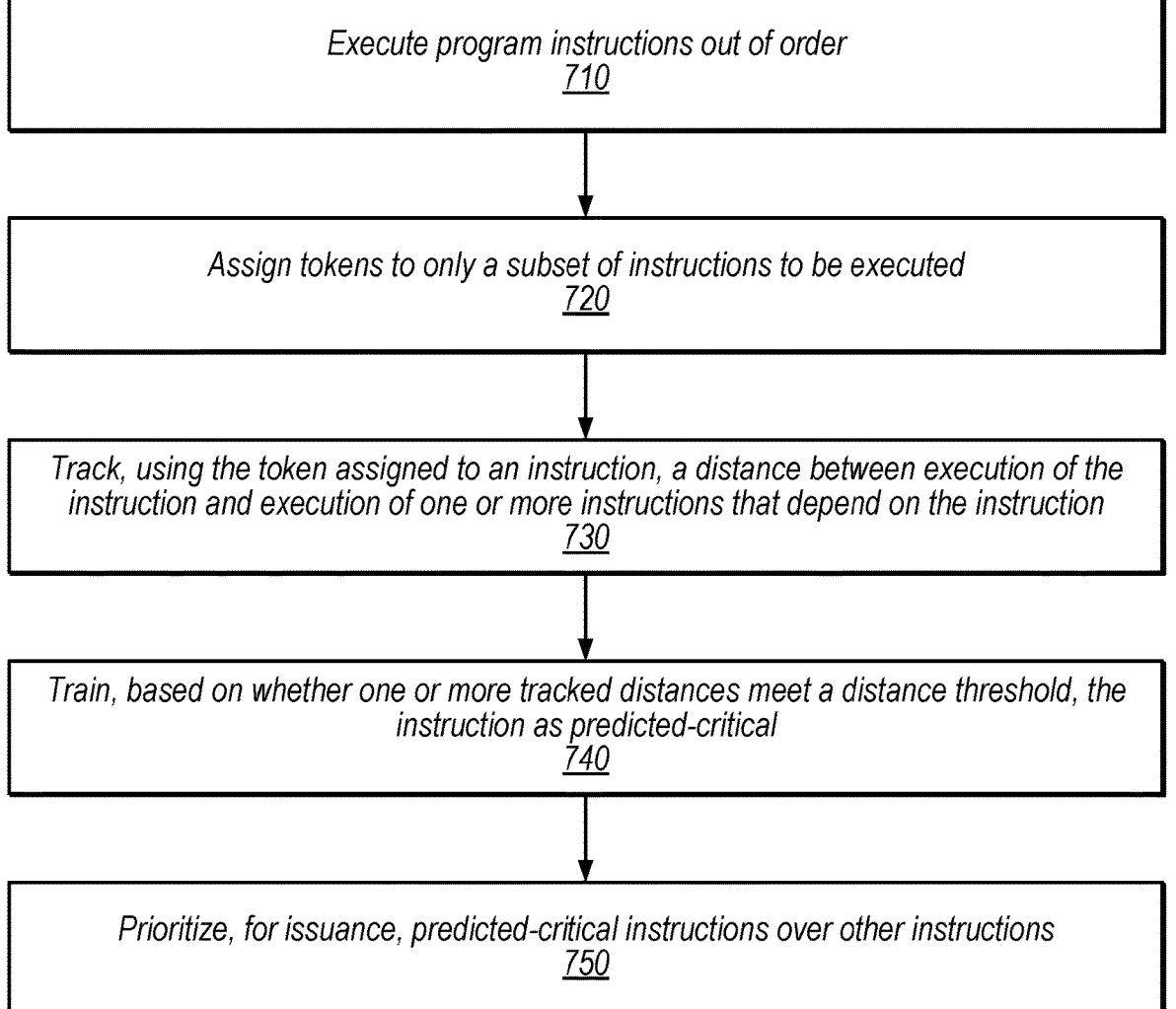

Execute program instructions out of order
710

Assign tokens to only a subset of instructions to be executed
720

Track, using the token assigned to an instruction, a distance between execution of the instruction and execution of one or more instructions that depend on the instruction
730

Train, based on whether one or more tracked distances meet a distance threshold, the instruction as predicted-critical
740

Prioritize, for issuance, predicted-critical instructions over other instructions
750

FIG. 7

CORE CRITICALITY PERFORMANCE ENHANCEMENTS

The present application claims priority to U.S. Provisional App. No. 63/370,455, entitled "Core Criticality Performance Enhancements," filed Aug. 4, 2022, the disclosure of which is incorporated by reference herein in its entirety.

BACKGROUND

Technical Field

This disclosure relates generally to computer processors and more particularly to identifying and prioritizing critical instructions.

Description of the Related Art

Generally, out-of-order processors issue the oldest ready instruction operation each cycle. Latency of executing instructions on a critical path may have the most substantial impact on processor performance. The critical path to a given instruction corresponds to a set of prior instructions that produce the latest-arriving input for that instruction. Reducing latency of instructions that are not on the critical path may have little to no impact on performance. The critical path for execution of a program on a given set of hardware may not be known until execution.

BRIEF DESCRIPTION OF THE DRAWINGS

FIG. 7 is a flow diagram illustrating an example method, according to some embodiments.

DETAILED DESCRIPTION

The critical path of execution is typically considered the bottleneck of a workload executing on a system as it is the longest sequence of dependent instructions that dictates the completion of a code sequence. For example, a delay in the critical path causes a delay in completion of a code sequence which negatively impacts execution time and overall system performance. In contrast, a delay in a non-critical path will not necessarily delay overall execution performance of a workload. Improving performance of the critical path will generally improve overall performance, while optimizations of non-critical paths may not significantly affect performance. Identifying the critical path through a code sequence may be achieved using various techniques, such as a token-passing algorithm. Token-passing assigns tokens to instructions that are fetched and executed by pipeline circuitry, then measures the distance between dependent instructions by passing a token from the instruction that generates the last-arriving operand on which a subsequent instruction depends. In this context, assigning tokens to each instruction may have various costs in terms of power consumption and hardware area.

In some embodiments, discussed in detail below, criticality detection circuitry may be configured to sparsely assign tokens to only a subset of instructions that are fetched and executed by pipeline circuitry. The circuitry may use the sparsely assigned tokens to track distances between execution of instructions and dependent instructions and identify the critical path of execution. This may allow identification of predicted-critical and predicted non-critical instructions with limited area and power impacts. The processor may prioritize predicted-critical instructions in various ways. Disclosed techniques may also provide performance advantages over traditional critical path identification mechanisms that are implemented via software libraries and packages.

As one example, scheduling circuitry may be configured to prioritize predicted-critical instructions over other instructions for issuance to execution circuitry, e.g., to supplement or replace traditional age-based prioritization. This may advantageously reduce latency of predicted-critical instructions, relative to traditional techniques.

As another example, cache controller circuitry may be configured to prioritize retention of cache lines targeted by one or more predicted-critical instructions over other cache lines. For example, cache controller circuitry may be configured to use different replacement policies based on whether a cache operation involves a predicted-critical instruction. Such a configuration may advantageously improve retention of cache lines accessed by predicted-critical instructions and reduce execution latency, relative to traditional techniques.

Overview of Criticality Detection Circuitry

Figure 1:
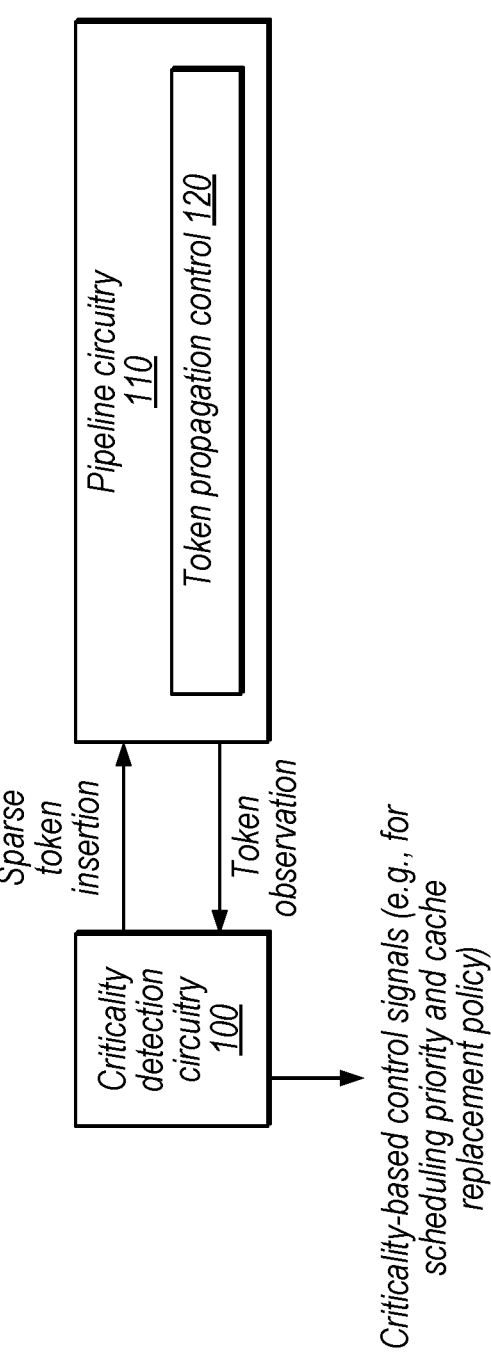
FIG. 1 is a block diagram illustrating an overview of example criticality detection circuitry, according to some embodiments.

FIG. 1 is a block diagram illustrating an overview of example criticality detection circuitry, according to some embodiments. The illustrated processor includes criticality detection circuitry 100, and pipeline circuitry 110. Pipeline circuitry 110, in turn, includes token propagation control circuitry 120.

In the illustrated embodiment, criticality detection circuitry 100 is configured to pseudo-randomly insert tokens for certain instructions as they pass through pipeline circuitry 110 and monitor active tokens in a system. As used herein, the term "active" refers to a token that has been assigned to an instruction and is being tracked as it propagates from one instruction to the next in the system. In some embodiments, to achieve pseudo-random insertion of tokens, a seed value may be retrieved from any number of various elements of the system. For example, the seed value may be provided by pipeline circuitry 110, a central processing unit (CPU), a sensor, memory, etc.

In some embodiments, criticality detection circuitry 100 uses a limited (sparse) pool of tokens. In some embodiments, criticality detection circuitry 100 may utilize 3 bits at most to track the limited pool of tokens in the system. In other embodiments, criticality detection circuitry 100 may use greater numbers of bits. For example, circuitry 100 may use 1, 2, 3, 4, etc. bits to represent tokens. Generally speaking, as used herein, the term "sparse," in the context of assigning tokens to instructions, is intended to mean a that tokens are assigned to fewer than all executed instructions. A greater number of bits used to represent tokens may increase area and power consumption of various processor elements, e.g., each reservation station may support tokens for each potential input operand. A sparse pool of tokens may still allow accurate identification of the critical path over an initial set of cycles of execution of a given portion of a program.

In some embodiments, criticality detection circuitry 100 is configured to track, using a token assigned to an instruction, a distance (e.g., in cycles) between execution of the instruction and execution of one or more instructions that depend on the instruction. As used herein, the term "distance" is a temporal concept and refers to a representation of a time interval between a given pair of execution events (e.g., in terms of clock cycles, change in value of a counter that is updated every N clock cycles, etc.). In some embodiments, criticality detection circuitry 100 is configured to take various actions based on determined distances between instructions. For example, in response to the distance meeting a first threshold, criticality detection circuitry 100 may generate criticality-based control signals that indicate a predicted-critical training event (e.g., train the instruction as critical), control scheduling priority, control adjustment of a cache replacement policy, etc. As another example, in response to the distance not meeting a second threshold, criticality detection circuitry 100 may generate criticality-based control signals that indicate a predicted-non-critical training event (e.g., train the instruction as non-critical and not on a critical path). In some embodiments, in response to predicted-critical and predicted-non-critical training events, criticality detection circuitry 100 may adjust a count value. A given instruction may be considered trained when its count value meets a threshold.

In the illustrated embodiment, pipeline circuitry 110 is configured to execute instructions, including instruction fetch, instruction decode, operand fetch, instruction execution (which may also be referred to as "performance" of the instruction, e.g., by an ALU), and operand store.

In the illustrated embodiment, token propagation control 120 is configured to transmit tokens with instructions throughout pipeline circuitry 110. For example, token propagation control 120 may propagate tokens through execution circuitry, a load-store unit, reservation stations, etc. As described in further detail below with respect to FIG. 3, embodiments of token propagation control 120 are configured to insert tokens for instructions as they pass through the fetch and decode stages into reservation stations, execute various types of instructions received by execution circuitry, and identify tokens that have propagated through execution circuitry, load-store unit, etc.

In some embodiments, criticality detection circuitry 100 is configured to observe tokens of executed instructions and make criticality-based predictions for one or more instructions. Once a given token has been used for a training event, it may become available for use to monitor other instructions. For example, in some embodiments, a token may be flushed and made available for pseudo-random reassignment in response to predicted-critical training events and predicted-non-critical training events. A token may also be flushed and made available for pseudo-random reassignment in response to other activity, such as a replay. As described in further detail below with respect to FIG. 3, embodiments of criticality detection circuitry 100 are configured to track token training information (e.g., a count value), mark instructions as predicted-critical or predicted-non-critical, track predicted-critical and predicted-non-critical instructions, and take various action based on identified predicted-critical and predicted-non-critical instructions.

Figures 2A, 2B, 2C:
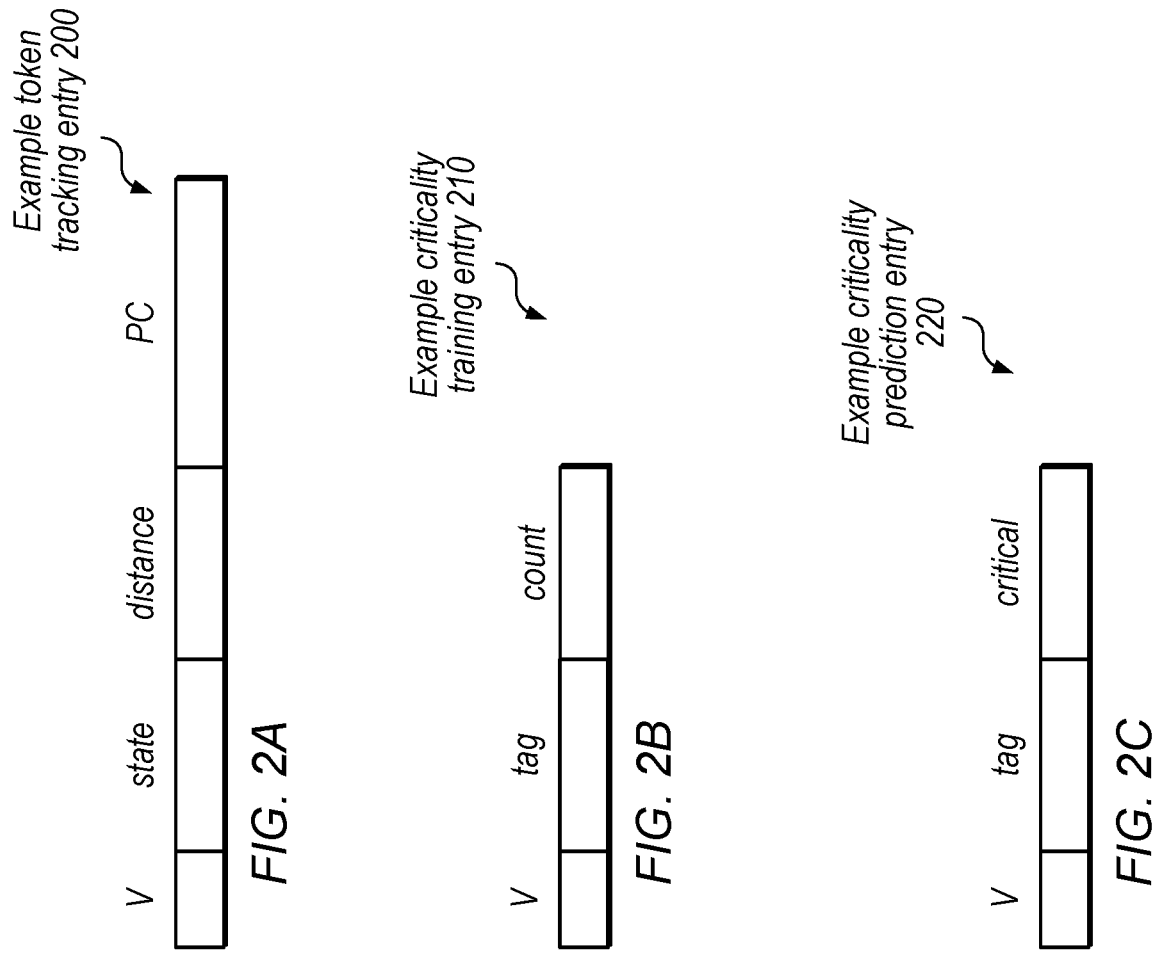
FIG. 2A is a diagram illustrating an example token tracking entry, according to some embodiments.
FIG. 2B is a diagram illustrating an example criticality training table entry, according to some embodiments.
FIG. 2C is a diagram illustrating an example criticality prediction table entry, according to some embodiments.

Example Token Tracking, Criticality Training, and Criticality Prediction Entries FIGS. 2A-2C illustrate example fields that control circuitry may use for token tracking, criticality training, and criticality prediction, according to some embodiments.

FIG. 2A is a diagram illustrating an example token tracking entry, according to some embodiments. In some embodiments, a token tracking entry is implemented for each token in the system. In the illustrated embodiment, example token tracking entry 200 includes four fields: valid (V), state, distance, and program counter (PC).

In some embodiments, the valid field represents whether a particular token entry is valid or invalid. In some embodiments, the valid field may be represented by a single bit. In some embodiments, the valid field represents whether a particular token entry is valid (e.g., in-flight) or invalid (e.g., available for insertion).

In some embodiments, the state field represents the current state of a token. In some embodiments, a token entry may be in one of four states. In a first state, the token is exposed to front-end circuitry and is available to be injected onto an incoming instruction. In a second state, an instruction with a token is observed and recorded in token training circuitry. In a third state, a training event is identified for the instruction with the observed token, the result of which is propagated to front-end circuitry. In a fourth state, a flush control signal is asserted by criticality control (e.g., to each reservation station) and the token is flushed and available for reassignment.

In some embodiments, the distance field represents a distance (e.g., number of cycles) between execution of an instruction and execution of one or more instructions that depend on the instruction. The distance is calculated based on token insertion, propagation, and observation procedures as discussed in detail below with reference to FIG. 3.

In some embodiments, the program counter (PC) field is updated when the first instruction with the token for a particular token tracking entry is issued from front-end circuitry. In some embodiments, the updated PC may correspond to the PC of the instruction.

FIG. 2B is a diagram illustrating an example criticality training table entry, according to some embodiments. In the illustrated embodiment, example criticality training table entry 210 includes three fields: valid (V), tag, and count.

In some embodiments, the valid field represents whether a particular criticality training table entry is valid or invalid. In some embodiments, the valid field may be represented by a single bit. In some embodiments, the valid field represents whether a particular entry is valid (e.g., being used to train an instruction) or invalid (e.g., available to train a new instruction).

In some embodiments, the tag field identifies a particular instruction, e.g., using its program counter. In some embodiments, the tag is the same tag format as a corresponding cache line. In other embodiments, other types of instruction identification information may be used as a tag.

In some embodiments, the count field holds a count value for a particular instruction. In some embodiments, the count value may be incremented or decremented based on various training events (e.g., incremented when a token distance for the instruction reaches an upper distance threshold and decremented when a token distance for the instruction does not meet a lower distance threshold). When the counter meets a counter threshold (e.g., an upper counter threshold that corresponds to predicted-critical or a lower counter threshold that corresponds to predicted-non-critical), an entry may be promoted to a criticality prediction entry, as discussed below, e.g., for use in prioritizing predicted-critical instructions.

FIG. 2C is a diagram illustrating an example criticality prediction table entry, according to some embodiments. In the illustrated embodiment, example, criticality prediction table entry 220 includes three fields: valid (V), tag, and critical.

In some embodiments, the valid field represents whether a particular criticality prediction table entry is valid or invalid. In some embodiments, the valid field may be represented by a single bit. In some embodiments, the valid field represents whether a particular entry is valid (e.g., indicates a prediction for an instruction) or invalid (e.g., should not be used for prediction).

In some embodiments, the tag field identifies a particular instruction.

In some embodiments, the critical field represents whether a criticality prediction table entry (e.g., instruction) is predicted-critical or predicted-non-critical. In some embodiments, the critical field may be represented using a single bit. The processor may assert various control signals to expedite execution of predicted-critical instructions, as discussed in detail below.

Example Detailed Criticality Detection Circuitry

Figure 3:
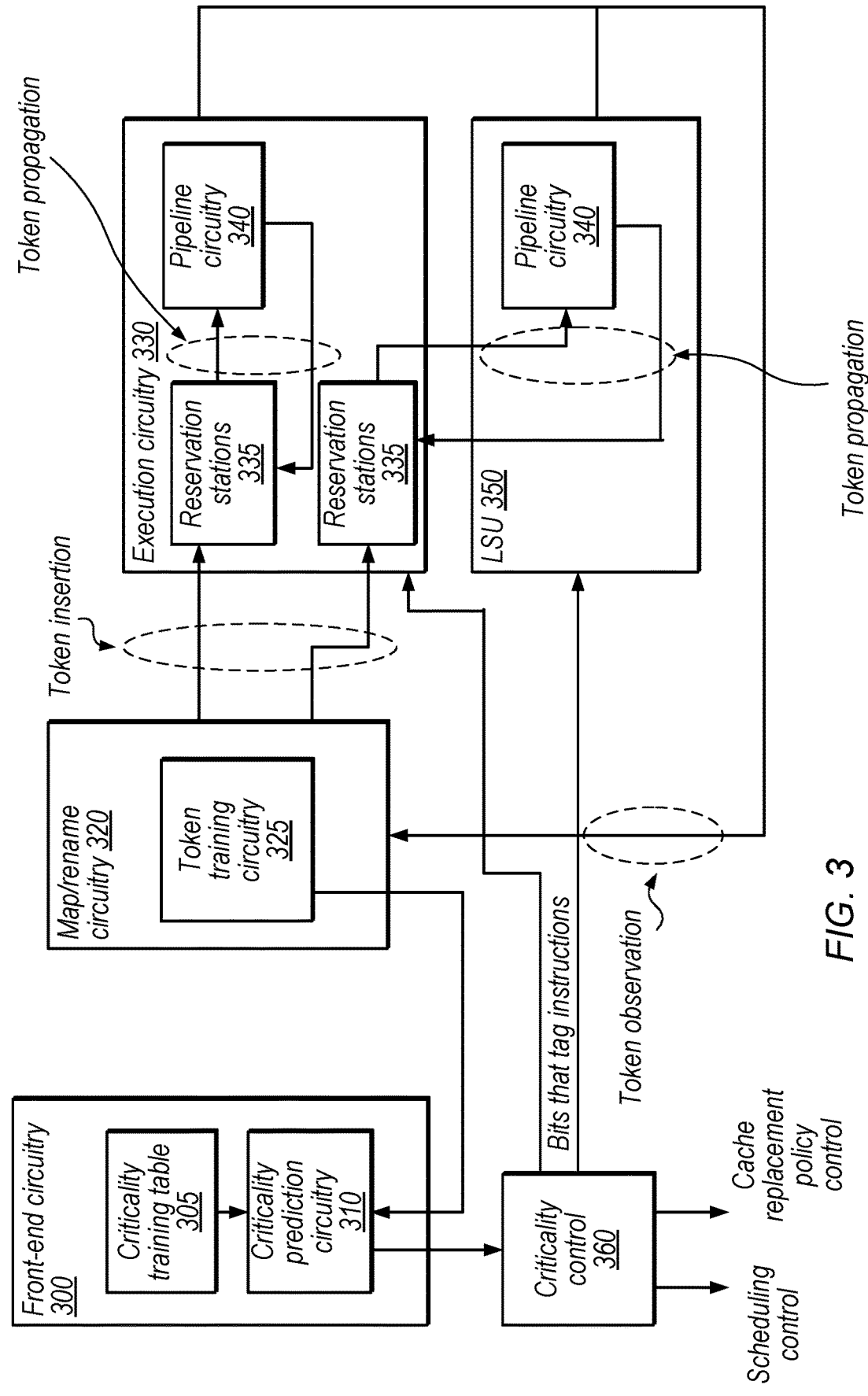
FIG. 3 is a block diagram illustrating detailed criticality detection circuitry, according to some embodiments.

FIG. 3 is a block diagram illustrating detailed criticality detection circuitry, according to some embodiments. The illustrated embodiment includes front-end circuitry 300, map/rename circuitry 320, execution circuitry 330, load-store unit (LSU) 350, and criticality control circuitry 360. Front-end circuitry 300, in turn, includes criticality training table 305 and criticality prediction table 310. Map/rename circuitry 320, in turn, includes token training circuitry 325. Execution circuit 330, in turn, includes reservation stations 335 and pipeline circuitry 340. LSU 350, in turn, includes pipeline circuitry 340.

In the illustrated embodiment, front-end circuitry 300 is configured to determine that some instructions are predicted-critical or predicted-non-critical. In some embodiments, front-end circuitry 300 generates training information (e.g., triggers a training event) based on a distance metric computed by token training circuitry 325, based on token training circuitry 325 making one or more token observations. As discussed above, token distance information may be used for criticality training and eventually criticality prediction. In some embodiments, subsequent to front-end circuitry 300 generating the training information, the token may be flushed and made available for pseudo-random reassignment to another instruction.

In the illustrated embodiment, criticality training table 305 is configured to track training information, such as a count value, for one or more instructions (e.g., using entries 210). In some embodiments, the count value is updated on training events in response to the distance metric meeting certain thresholds, as indicated by token training circuitry 325. For example, in response to the distance metric meeting an upper count threshold, token training circuitry 325 may train the instruction as predicted-critical and adjust a count value in the count field of criticality training table 305 for the instruction. As another example, in response to the distance metric not meeting a lower count threshold, token training circuitry 325 may train the instruction as predicted-non-critical and adjust a count value in the count field in the opposite direction.

In some embodiments, in response to the count value for an instruction meeting the upper count threshold, criticality training table 305 may write, to criticality prediction table 310, to mark the instruction predicted-critical. In some embodiments, in response to the count value for an instruction not meeting the lower count threshold, criticality training table 305 may write, to criticality prediction table 310, to mark the instruction predicted-non-critical.

In the illustrated embodiment, criticality prediction table 310 is configured to track predicted-critical and predicted-non-critical instructions, e.g., using entries 220. In some embodiments, the identification of predicted-critical and predicted-non-critical instructions may be indicated by a single bit.

In some embodiments, criticality training table 305 and criticality prediction table 310 share the same geometry as an instruction cache of the system (not shown). In some embodiments, to share the same geometry as an instruction cache includes to share the same topology (e.g., set associative, fully associative, direct mapped, etc.) such that the same set of bits of the address can be used as the tag to access both sets of circuitry. In these embodiments, criticality training table 305 and criticality prediction table 310 may be read in parallel with the instruction cache and used to label operations corresponding to fetched instructions as critical or non-critical. In these embodiments, training table 305 and criticality prediction table 310 may use the same tag format as used by the cache, to reference particular training information, predicted-critical, and predicted non-critical instructions.

In some embodiments, criticality control 360 may take various actions based on predicted-critical and predicted-non-critical instructions indicated by criticality prediction circuitry 310. For example, in response to criticality prediction circuitry 310 indicating an instruction as predicted-critical or predicted-non-critical, criticality control 360 may issue control signals for instruction scheduling or cache replacement policy change, for example, as discussed in detail below with reference to FIGS. 4-6. As another example, in response to criticality prediction circuitry 310 indicating an instruction as predicted-critical or predicted-non-critical, criticality control 360 may propagate bits to execution circuitry 330 and LSU 350 to tag the instruction as predicted-critical or predicted-non-critical.

In the illustrated embodiment, map/rename circuitry 320 is configured to insert tokens for instructions as they pass through the fetch and decode stages. In some embodiments, a token is pseudo-randomly inserted with an instruction as it passes through map/rename circuitry 320 into reservation stations 335. In some embodiments, a limited pool of tokens is maintained, which may be advantageous in the context of power consumption and area considerations.

In the illustrated embodiment, execution circuitry 330 is configured to execute various types of instructions received by map/rename circuitry 320. In some embodiments, execution circuitry 330 is configured to execute arithmetic functions (e.g., instructions such as add, subtract, multiply, etc.). In some embodiments, instructions with inserted tokens propagate through execution circuitry 330. LSU 350 may perform load and store instructions and may access a memory hierarchy in response to cache misses, for example. In some embodiments, instructions with inserted tokens propagate through LSU 350.

In other embodiments, any of various appropriate types of execution units may be implemented.

In some embodiments, map/rename circuitry 320 is further configured to observe tokens that have propagated through execution circuitry 330 and LSU 350. In some embodiments, to observe tokens includes to identify tokens/instructions that have propagated through execution circuitry 330 and LSU 350. In some embodiments, distance information may be computed based on identifying tokens/instructions that have propagated through execution circuitry 330 and LSU 350. In some embodiments, tokens that are observed by map/rename circuitry 320 are tracked via token training circuitry 325.

In the illustrated embodiment, reservation stations 335 are configured to store operand data until an instruction's inputs are ready and may facilitate register renaming. In some embodiments criticality control 360 may issue scheduling control signals to prioritize scheduling of predicted-critical operations over predicted-non-critical operations, e.g., when issuing instructions from reservation stations 335. Note that map/rename circuitry 320, execution circuitry 330, reservation stations 335, pipeline circuitry 340, and LSU 350 may be included in token propagation control 120.

In some embodiments, reservation stations 335 may be either shifting reservation stations or non-shifting reservation stations, as discussed below. In the illustrated embodiment, reservation stations are included in execution circuitry 330 but not LSU 350, but reservation stations may be located at various appropriate locations in other implementations.

In some embodiments, shifting reservation stations are configured to shift operation data as instructions are issued, e.g., to keep the oldest operations at the head of the reservation stations as operations are issued for execution.

In some embodiments, shifting reservation stations are further configured to time-multiplex instruction picker circuitry for operation issuance. Time-multiplexing the picker for issuance may include masking predicted-non-critical operations and issuing the oldest predicted-critical operation in the next cycle, in response to a determination that at least one critical operation is ready to be issued.

In some embodiments, time-multiplexing the picker for issuance may also include issuing the oldest ready operation in the next cycle when no critical operations are ready to be issued.

In some embodiments, non-shifting reservation stations utilize an age matrix configured to track the age of operations. In some embodiments, a critical operation is recorded in the age matrix (e.g., as older than any predicted-non-critical operation) by artificially adjusting one or more fields associated with the age matrix. Adjustment of the one or more fields may allow critical operations to be prioritized for scheduling.

As used herein, an "artificial" adjustment refers to an adjustment that changes a value to misrepresent relative operations of instructions or readiness of operations in order to influence their priority.

In some embodiments, age priority among non-shifting reservation station entries is determined by using an upper-triangular age matrix. In some embodiments, each element of the age matrix represents the age relationship between a pair of reservation station entries and may be represented by a single bit. For example, an element value of "1" represents that the entry at the row index is older, while an element value of "0" represents that the entry at the column index is older. In some embodiments, all bits in the age matrix are cleared to "0" for each row that corresponds to an invalid entry.

In some embodiments, a ready bit of a non-shifting reservation station entry may be used to represent whether an operation is ready to be issued. In some embodiments, the ready bit may be artificially suppressed in certain scenarios to allow prioritization of critical operations. For example, an operation that is considered to be critical (e.g., one that has its critical bit set does not have its corresponding reservation station entry ready bit suppressed. As another example, a non-critical operation's reservation station entry ready bit is generally suppressed in many scenarios but is allowed to be set when at least one of the following conditions are met: (1) there are no critical operations in the reservation station (2) there is only one ready critical operation in the reservation station and there are no non-critical operations ready in the reservation station (3) there is only one critical operation ready in the reservation station and that critical operation is older than the non-critical operation.

In other embodiments, control circuitry may artificially adjust actual age information (e.g., in the age matrix) to indicate that a critical operation is older than a non-critical operation, even when the critical operation is actually younger.

In some embodiments, non-shifting reservation stations that are referenced by LSU 350 rely on the age matrix to enforce operation ordering. In some embodiments, the combination of shifting and non-shifting reservation stations may allow time-multiplexing of the picker in certain situations and disabling criticality-based picking when order needs to be enforced, in other situations. Therefore, control circuitry may turn off criticality-based picking in certain scenarios.

In the illustrated embodiment, criticality control 360 may take various actions based on criticality-based predictions by criticality prediction circuitry 310. In some embodiments, criticality control 360 may modify a least-recently-used (LRU) cache replacement policy for a data cache, e.g., to prioritize retention of critical cache lines. In other embodiments, the modified replacement policy may be one of various other types of replacement policy (e.g., first-in-first-out, last-in-first-out, etc.). Generally, prioritizing retention of cache lines targeted by predicted-critical instructions may improve processor performance by improving cache hit rate for those instructions and thereby favorably affecting the critical path.

Note that front-end circuitry 300, criticality training table 305, criticality prediction circuitry 310, and criticality control 360 may be included in criticality detection circuitry 100.

Example Criticality-Based Cache Retention Techniques

Figure 4:
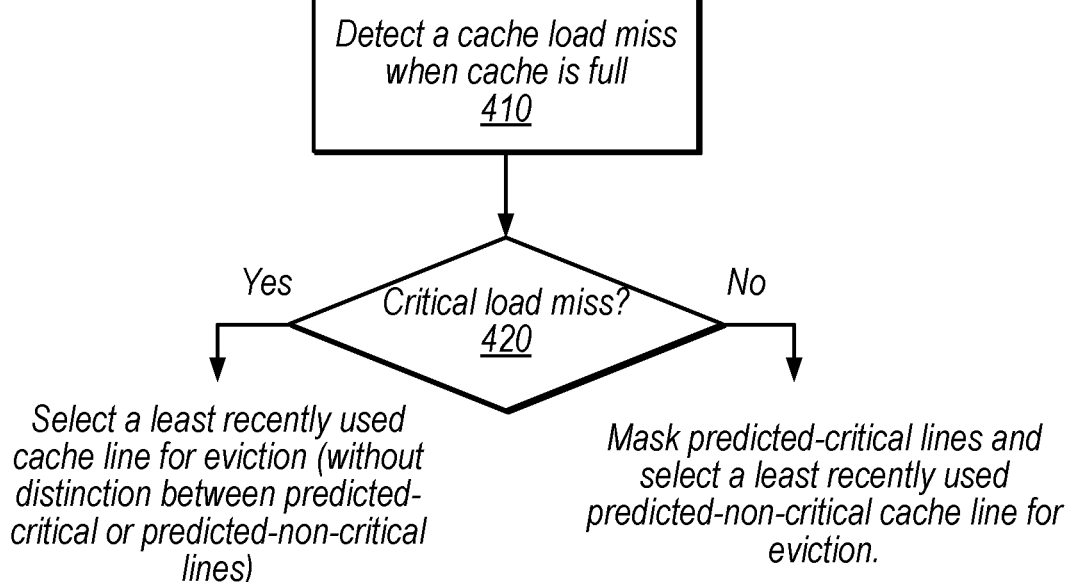
FIG. 4 is a flow diagram illustrating an example method for handling cache load misses, according to some embodiments.

FIG. 4 is a flow diagram illustrating an example method for handling cache load misses, according to some embodiments. As discussed above, cache control circuitry may operate differently depending on whether a cache operation is for a predicted-critical instruction.

At 410, in the illustrated embodiment, cache control circuitry detects a cache load miss, e.g., based on tag data for the load not matching any valid cache lines in a cache. In response to the miss, the cache control circuitry may allocate an entry for the load data to be cached once it is retrieved. If the cache is full, the cache control circuitry may need to select another line to evict, as discussed in detail below. Speaking generally, cache control circuitry may maintain different sets of replacement policy information (e.g., LRU stacks) for use based on whether a miss is for a load that was predicted-critical.

In some embodiments, cache control circuitry may maintain a bit for each cache line that indicates whether it has been targeted by a predicted-critical load.

At 420, in the illustrated embodiment, cache control circuitry determines whether the cache load miss is a critical load miss (e.g., a miss for a load instruction that was predicted-critical). In the illustrated embodiment, if the cache load miss is determined to be a critical load miss, then a least recently used cache line is selected for eviction, without distinction between predicted-critical and predicted-non-critical cache lines (e.g., using a traditional selection mechanism).

In the illustrated embodiment, if the cache load miss is determined not to be a critical load miss, then cache lines that include predicted-critical instructions are masked and a least recently used cache line that includes a predicted-non-critical instruction is selected. The terms "masked," "mask," and "masks," used herein, refers to an element not being eligible for selection by one or more other elements. In this mode of operation, a predicted-non-critical load will not cause eviction of a cache line targeted by a predicted-critical load. In some embodiments, limits may be placed on the mechanism to prioritize retention of predicted-critical lines, e.g., to allow predicted-critical lines to be selected for replacement by data for non-critical loads in certain scenarios.

Figure 5:
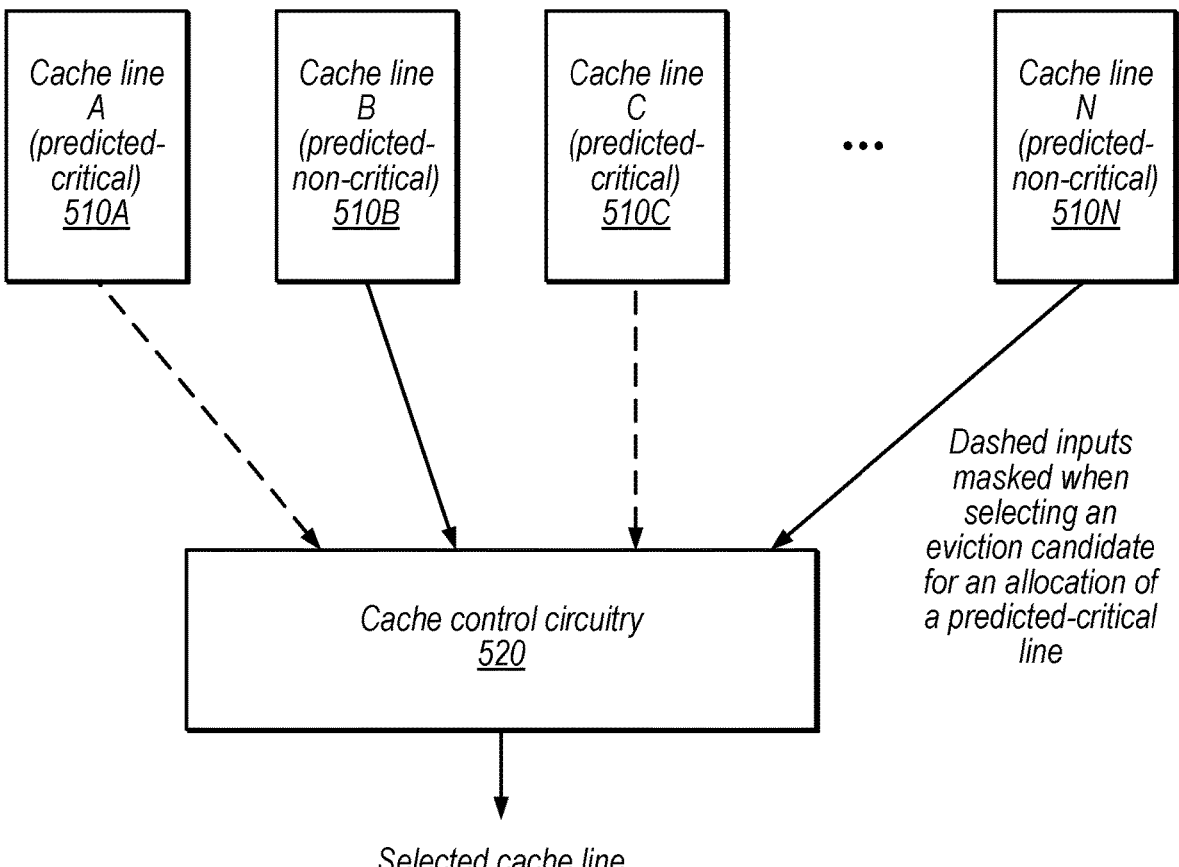
FIG. 5 is a block diagram illustrating example reservation stations and scheduling modes, according to some embodiments.

FIG. 5 is a block diagram illustrating example sets of cache lines considered for replacement in different scenarios, according to some embodiments. The illustrated embodiment includes cache lines 510A-510N and cache control circuitry 520.

In the illustrated embodiment, cache lines 510A-510N may include predicted-critical and predicted-non-critical cache lines. As discussed above, multiple retention policies may be employed depending on whether a cache miss was for a predicted-critical load. As one example, LRU-among-non-critical-lines may be used for non-critical load misses and LRU-among-all-lines may be used for critical load misses. In other embodiments, various different replacement schemes may be implemented based on whether a miss is for a critical load; the disclosed LRU schemes are included for purposes of illustration but are not intended to limit the scope of the present disclosure.

In some embodiments, a first class of the modified LRU mechanism ranks all cache lines, including predicted-critical and predicted-non-critical cache lines, when a critical load misses.

In some embodiments, a second class of the modified LRU mechanism masks predicted-critical cache lines in cache lines 510A-510N and selects the LRU predicted-non-critical cache line when a non-critical load misses.

In some embodiments, one or more cache lines 510A-510N may not be eligible for eviction by cache control circuitry 520, as indicated by the dashed lines, in some situations based on a determination of predicted-critical and predicted-non-critical cache lines and whether the instruction that caused the eviction is predicted-critical.

In the illustrated embodiment, cache control circuitry 520 is configured to select a cache line from cache lines 510A-510N based on one of the two classes of the modified LRU mechanism.

Example Reservation Station Scheduling Modes

Figure 6:
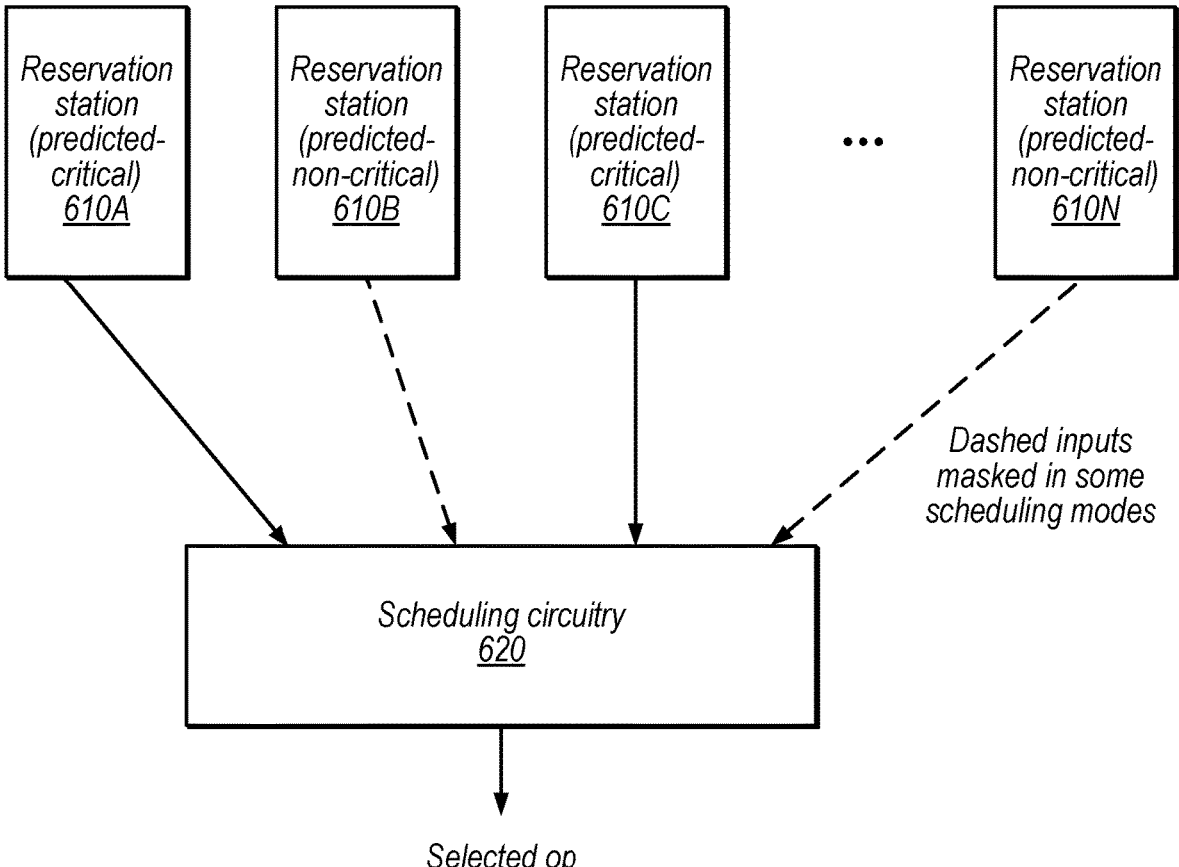
FIG. 6 is a block diagram illustrating example cache lines and retention modes, according to some embodiments.

FIG. 6 is a block diagram illustrating example reservation stations and scheduling modes, according to some embodiments. The illustrated embodiment includes reservation stations 610A-610N and scheduling circuitry 620.

In some embodiments, operands for instructions are stored in reservation stations 610A-610N until instructions are ready to issue. In some embodiments, scheduling circuitry 620 may select from among predicted-critical and predicted-non-critical operations for which data is stored in reservation stations 610A-610N.

In the illustrated embodiment, reservation stations 610A-610N are configured to temporarily store operation data and may be masked from scheduling circuitry 620. For example, reservation station 610B, in the illustrated embodiment, may not be eligible for selection by scheduling circuitry 620, as indicated by the dashed lines, in some scheduling modes based on a determination of predicted-critical and predicted-non-critical operations for which data is stored in the reservation station.

In some embodiments, reservation stations 610A-610N may include one or more shifting reservation stations that keep the oldest operation data at the head of the reservation stations as operations are issued. In some embodiments, scheduling circuitry 620 may mask reservation stations that include data for predicted-non-critical operations and schedule an operation from a reservation station that includes data for a predicted-critical operation, if at least one of the reservation stations 610A-610N include data for a predicted-critical operation. In some embodiments, if none of reservation stations 610A-610N include data for a predicted-critical operation, scheduling circuitry 620 may schedule an operation from a reservation station that includes the oldest ready operation data.

In some embodiments, reservation stations 610A-610N may include one or more non-shifting reservation stations that include an age matrix that tracks the age of operations. In some embodiments, a predicted-critical operation may be recorded in the age matrix of a reservation station as older than other operations via adjustment of one or more fields in the age matrix. Adjusting one or more fields for a predicted-critical operation may advantageously prioritize scheduling of the predicted-critical operation when it is ready for issuance.

In some embodiments, a ready bit of a non-shifting reservation station entry may be used to represent whether an operation is ready to be issued, as discussed in detail with reference to FIG. 3 above.

In the illustrated embodiment, scheduling circuitry 620 is configured to select an operation from one of reservation stations 610A-610N. In some embodiments, one or more of reservation stations 610A-610N may not be eligible for selection by scheduling circuitry 620.

Example Method

FIG. 7 is a flow diagram illustrating an example method for identifying predicted-critical and predicted non-critical instructions, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a processor pipeline executes program instructions out of program order.

At 720, in the illustrated embodiment, criticality detection circuitry assigns tokens to only a subset of instructions to be executed. In some embodiments, a limited (sparse) pool of tokens may be used and may still allow accurate identification of the critical path with limited area and power impacts. In some embodiments, the limited pool of tokens are represented using at most three bits.

At 730, in the illustrated embodiment, criticality detection circuitry tracks, using the token assigned to an instruction, a distance between execution of the instruction and execution of one or more instructions that depend on the instruction.

In some embodiments, in response to the distance meeting or not meeting certain thresholds, criticality detection circuitry may receive certain training information from token training circuitry (e.g., a training event).

At 740, in the illustrated embodiment, criticality detection circuitry trains, based on whether one or more tracked distances meet a distance threshold, the instruction as predicted-critical.

In some embodiments, criticality detection circuitry includes a criticality training table that tracks training information, such as a count value, for one or more instructions. The count value may be updated in response to the tracked distance meeting certain thresholds. For example, in response to the distance meeting an upper distance threshold, the criticality training table may adjust the count value for the instruction. As another example, in response to the distance not meeting a lower distance threshold, the criticality training table may adjust the count value for the instruction in the opposite direction.

In some embodiments, a training event may indicate adjusting a count value or predicting an instruction as predicted-critical or predicted-non-critical.

In some embodiments, criticality detection circuitry includes a criticality prediction table that stores an indication of whether trained instructions are predicted-critical. For example, in response to the count value for an instruction meeting an upper count threshold, criticality prediction table indicates the instruction as predicted critical. As another example, in response to the count value for an instruction not meeting a lower count threshold, criticality prediction table indicates the instruction as predicted non-critical.

At 750, in the illustrated embodiment, scheduling circuitry prioritizes, for issuance, predicted-critical instructions over other instructions.

In some embodiments, cache control circuitry prioritizes, at victim selection, retention of cache lines that are targeted by predicted-critical instructions over other cache lines.

In some embodiments, cache control circuitry selects from among multiple replacement policies based on whether a corresponding cache miss is for a predicted-critical instruction. In some embodiments, cache control circuitry uses a first replacement policy for cache misses for predicted-critical instruction, where the first policy selects a least recently used cache line from among both cache lines that include predicted-critical instructions and cache lines that do not include any predicted-critical instructions.

In some embodiments, cache control circuitry uses a second replacement policy for cache misses for predicted-critical instructions, where the second policy masks cache lines that include predicted-critical instructions such that they are not eligible for selection and selects a least recently used cache line that does not include any predicted-critical instructions.

In some embodiments, scheduling circuitry includes a set of reservation stations and in response to determining that a predicted-critical instruction is stored in the set of reservation stations, scheduling circuitry picks an oldest predicted-critical instruction for issuance to execution circuitry. In some embodiments, in response to determining that no predicted-critical instruction is stored in the set of reservation stations, scheduling circuitry picks an oldest ready instruction for issuance to execution circuitry.

In some embodiments, scheduling circuitry includes tracking circuitry that tracks relative ages of instructions and operates according to both a first mode and a second mode of operation. In some embodiments, the first mode of operation prioritizes predicted-critical instructions over other instructions for issuance to execution circuitry and artificially adjusts age values or ready values of predicted-critical instructions in the tracking circuitry. In some embodiments, the second mode of operation does not prioritize predicted-critical instructions and scheduling circuitry uses tracking circuitry to enforce ordering.

Example Device

Figure 8:
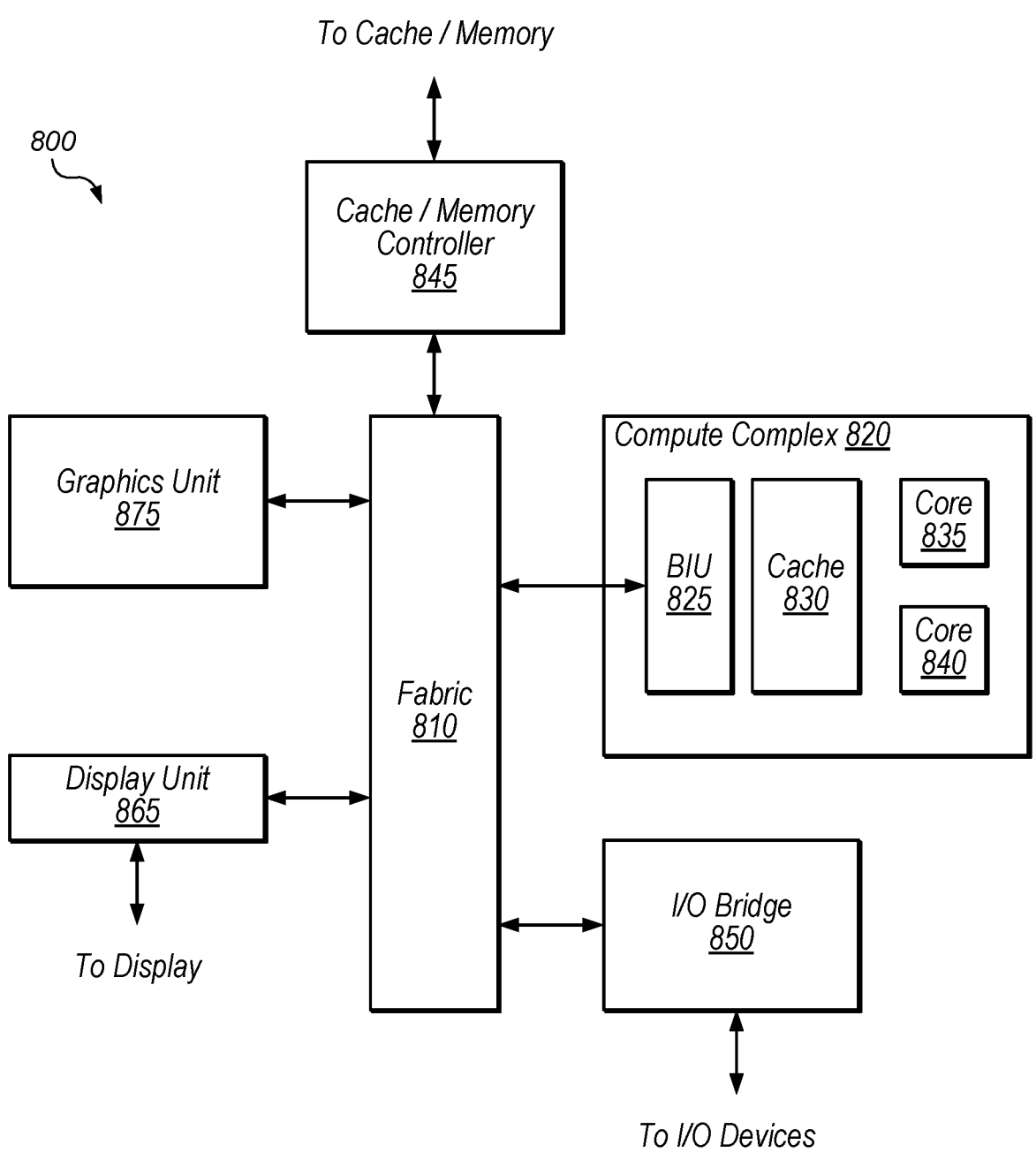
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (12C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, network interface circuitry may provide device 800 with connectivity to various types of other devices and networks.

Example Applications

Figure 9:
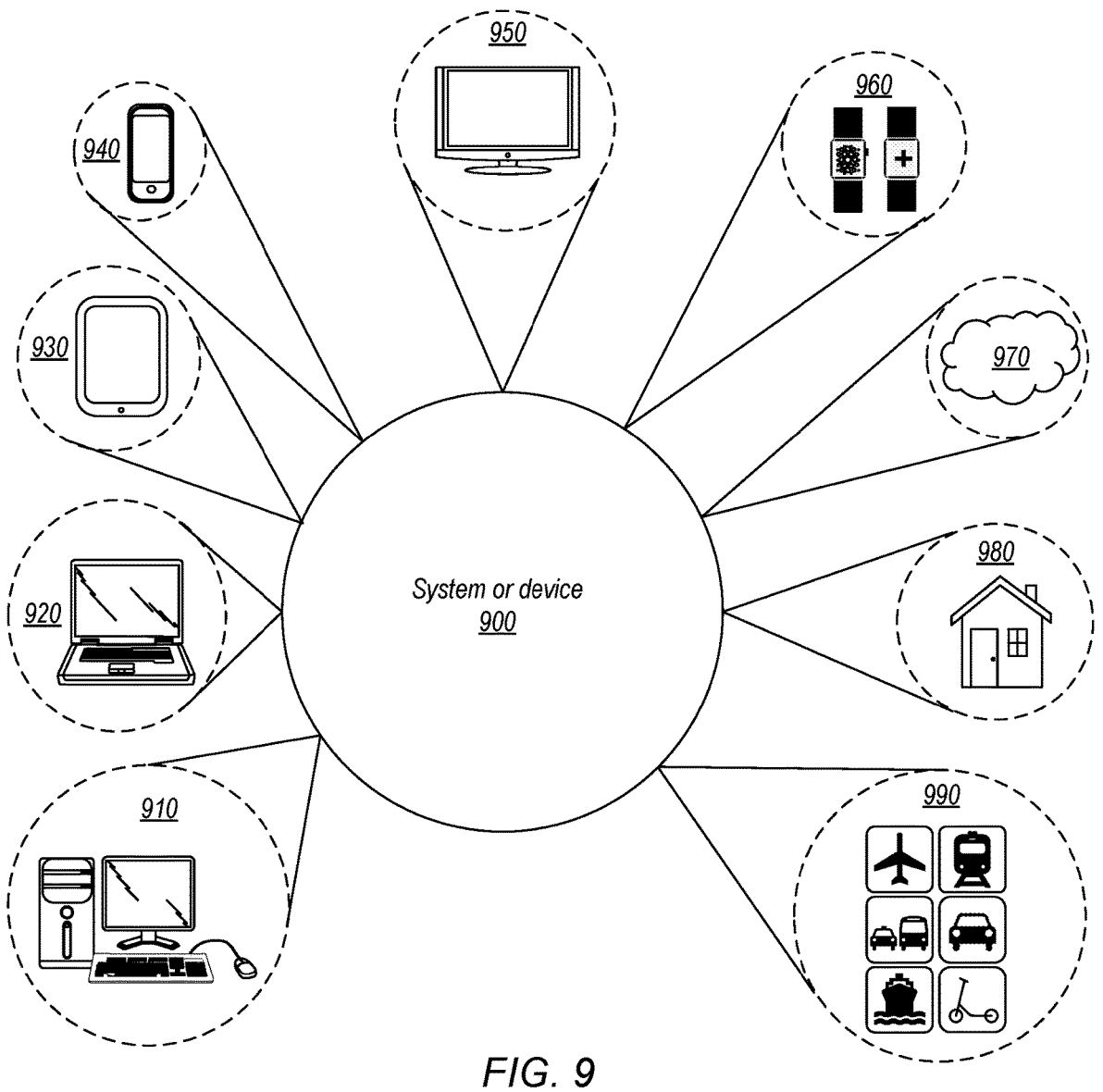
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
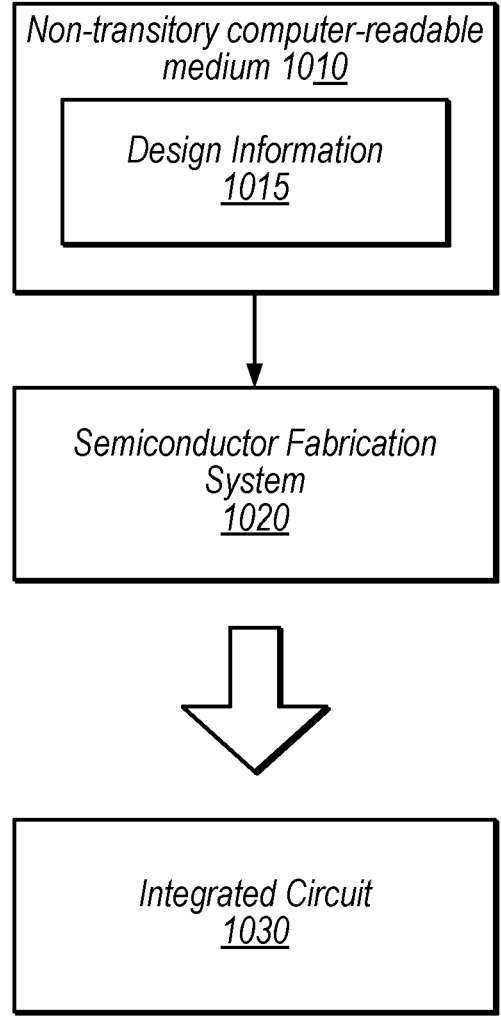
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M. MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1, 3, 5, and 6. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:

processor pipeline circuitry configured to execute program instructions out of program order;

criticality detection circuitry configured to:

assign tokens to only a subset of instructions to be executed by the processor pipeline circuitry;

track, using a token assigned to a first instruction, a distance corresponding to a number of cycles between execution of the first instruction and execution of one or more instructions that depend on the first instruction, including to:

detect that a second instruction of the one or more instructions depends on the first instruction;

determine that the first instruction generates a last-arriving operand of the second instruction; and pass the token from the first instruction to the second instruction based on the determination; and based on whether one or more tracked distances meet a distance threshold using tokens, train the first instruction as predicted critical; and scheduling circuitry configured to prioritize predicted-critical instructions over other instructions for issuance to execution circuitry.

2. The apparatus of claim 1, further comprising:

criticality training table circuitry configured to train one or more instructions as predicted critical or predicted non-critical, including:

in response to the distance meeting a first distance threshold, train the first instruction as predicted critical, including to adjust a counter; and in response to the distance not meeting a second distance threshold, train the first instruction as predicted non-critical, including to adjust the counter;

criticality prediction table circuitry configured to store an indication of whether trained instructions are predicted-critical, including:

in response to the counter meeting a first counter threshold, indicate the first instruction as predicted critical; and in response to the counter not meeting a second counter threshold, indicate the first instruction as predicted non-critical.

3. The apparatus of claim 1, further comprising:

cache control circuitry configured to prioritize, at victim selection, retention of cache lines targeted by predicted-critical instructions over other cache lines.

4. The apparatus of claim 3, wherein, to prioritize retention of cache lines that include predicted-critical instructions over other cache lines, the cache control circuitry is configured to select from among multiple replacement policies based on whether a corresponding cache miss is for a predicted-critical instruction.

5. The apparatus of claim 4, wherein the cache control circuitry is further configured to:

use a first replacement policy for cache misses for predicted-critical instructions, wherein the first replacement policy selects a least recently used cache line from among both cache lines that include predicted-critical instructions and cache lines that do not include any predicted-critical instructions.

6. The apparatus of claim 5, wherein the cache control circuitry is further configured to:

use a second replacement policy for cache misses for predicted-non-critical instructions, wherein the second replacement policy:

masks cache lines that include predicted-critical instructions such that they are not eligible for selection; and selects a least recently used cache line that does not include any predicted-critical instructions.

7. The apparatus of claim 1, wherein the assigned tokens are represented using at most three bits.

8. The apparatus of claim 1, wherein the scheduling circuitry includes a set of reservation stations, wherein to prioritize predicted-critical instructions over other instructions for issuance to execution circuitry, the scheduling circuitry is further configured to:

in response to determining that a predicted-critical instruction is stored in the set of reservation stations, pick an oldest predicted-critical instruction in the set of reservation stations; and in response to determining that no predicted-critical instruction is stored in the set of reservation stations, pick an oldest ready instruction in the set of reservation stations.

9. The apparatus of claim 1, wherein the scheduling circuitry includes:

tracking circuitry configured to track relative ages of instructions;

wherein the scheduling circuitry is further configured to operate according to both:

a first mode of operation to prioritize predicted-critical instructions over other instructions for issuance to execution circuitry when at least one predicted-critical instruction is ready for scheduling, wherein the first mode of operation artificially adjusts age values or ready values of predicted-critical instructions in the tracking circuitry; and a second mode of operation that does not prioritize predicted-critical instructions over other instructions, wherein the scheduling circuitry is configured to use the tracking circuitry to enforce ordering in the second mode of operation.

10. The apparatus of claim 1, wherein the apparatus is a computing device that further includes:

a display; and network interface circuitry.

11. A method, comprising:

executing program instructions out of program order;

assigning tokens to only a subset of instructions to be executed;

tracking, using the token assigned to first instruction, a distance corresponding to a number of cycles between execution of the first instruction and execution of one or more instructions that depend on the first instruction, including:

detecting that a second instruction of the one or more instructions depends on the first instruction;

determining that the first instruction generates a last-arriving operand of the second instruction; and passing the token from the first instruction to the second instruction based on the determination;

training the first instruction as predicted-critical based on whether one or more tracked distances meet a distance threshold using tokens; and prioritizing predicted-critical instructions over other instructions for issuance.

12. The method of claim 11, further comprising:

training, in response to the distance meeting a first distance threshold, the first instruction as predicted critical, including to adjust a counter;

training, in response to the distance not meeting a second distance threshold, the first instruction as predicted non-critical, including to adjust the counter;

indicating, in response to the counter meeting a first counter threshold, the first instruction as predicted critical; and indicating, in response to the counter not meeting a second counter threshold, the first instruction as predicted non-critical.

13. The method of claim 11, further comprising:

prioritizing, at victim selection, retention of cache lines targeted by predicted-critical instructions over other cache lines.

14. The method of claim 13, further comprising:

selecting from among multiple replacement policies based on whether a corresponding cache miss is for a predicted-critical instruction.

15. The method of claim 14, further comprising:

using a first replacement policy for cache misses for predicted-critical instructions, wherein the first replacement policy selects a least recently used cache line from among both cache lines that include predicted-critical instructions and cache lines that do not include any predicted-critical instructions.

16. The method of claim 15, further comprising:

using a second replacement policy for cache misses for predicted-non-critical instructions, wherein the second replacement policy masks cache lines that include predicted-critical instructions such that they are not; and selecting a least recently used cache line that does not include any predicted-critical instructions.

17. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

processor pipeline circuitry configured to execute program instructions out of program order;

criticality detection circuitry configured to:

assign tokens to only a subset of instructions to be executed by the processor pipeline circuitry;

track, using a token assigned to a first instruction, a distance corresponding to a number of cycles between execution of the first instruction and execution of one or more instructions that depend on the first instruction, including to:

detect that a second instruction of the one or more instructions depends on the first instruction;

determine that the first instruction generates a last-arriving operand of the second instruction; and pass the token from the first instruction to the second instruction based on the determination; and based on whether one or more tracked distances meet a distance threshold using tokens, train the first instruction as predicted critical; and scheduling circuitry configured to prioritize predicted-critical instructions over other instructions for issuance to execution circuitry.

18. The non-transitory computer readable medium of claim 17, further comprising:

criticality training table circuitry configured to train one or more instructions as predicted critical or predicted non-critical, including:

in response to the distance meeting a first distance threshold, train the first instruction as predicted critical, including to adjust a counter; and in response to the distance not meeting a second distance threshold, train the first instruction as predicted non-critical, including to adjust the counter;

criticality prediction table circuitry configured to store an indication of whether trained instructions are predicted-critical, including:

in response to the counter being meeting a first counter threshold, indicate the first instruction as predicted critical; and in response to the counter not meeting a second counter threshold, indicate the first instruction as predicted non-critical.

19. The non-transitory computer readable medium of claim 17, wherein the scheduling circuitry includes a set of reservation stations, wherein to prioritize predicted-critical instructions over other instructions for issuance to execution circuitry, the scheduling circuitry is further configured to:

in response to determining that a predicted-critical instruction is stored in the set of reservation stations, pick an oldest predicted-critical instruction in the set of reservation stations; and in response to determining that no predicted-critical instruction is stored in the set of reservation stations, pick an oldest ready instruction in the set of reservation stations.

* * * * *